United States Patent [19]

EerNisse et al.

[11] Patent Number: 4,754,646
[45] Date of Patent: Jul. 5, 1988

[54] RESONATOR PRESSURE TRANSDUCER STRUCTURE AND METHOD OF MANUFACTURE

[75] Inventors: Errol P. EerNisse, Salt Lake City; Roger W. Ward, Park City, both of Utah

[73] Assignee: Quartztronics, Inc., Salt Lake City, Utah

[21] Appl. No.: 9,144

[22] Filed: Jan. 30, 1987

[51] Int. Cl.⁴ .................................. G01L 11/00
[52] U.S. Cl. ...................... 73/702; 310/338
[58] Field of Search ............... 73/702, 40.5 A, 151, 73/115, 32 A, 52; 310/338, 344

[56] References Cited

U.S. PATENT DOCUMENTS 4,550,610 11/1985 EerNisse .................. 73/702
4,660,420 4/1987 EerNisse .................. 73/702

Primary Examiner—Donald O. Woodiel
Attorney, Agent, or Firm—Thorpe, North & Western

[57] ABSTRACT

A quartz resonator pressure transducer includes a generally disc-shaped resonator section adapted to vibrate in response to an oscillatory signal, a housing having sidewalls which generally circumscribe the resonator section and extend in opposite directions generally normal to the plane of the resonator section, and a web, thinner than the resonator section, joining the housing to the perimeter of the resonator section to define grooves between the sidewalls of the housing and the resonator section on the top and bottom sides of the section.

8 Claims, 1 Drawing Sheet

RESONATOR PRESSURE TRANSDUCER STRUCTURE AND METHOD OF MANUFACTURE

BACKGROUND OF THE INVENTION

This invention relates to crystal resonator structure for measuring pressure in fluids and a method of manufacture thereof.

One of the present techniques used in measuring pressure in caustic environments, such as in deep oil and gas wells, involves the use of a quartz crystal transducer apparatus which includes a circular resonator section peripherally supported within a hollow, cylindrical housing formed as an integral part of the resonator section. See U.S. Pat. Nos. 3,617,780 and 3,561,832. The resonator section of such apparatus is caused to vibrate by oscillatory electrical signals applied to electrodes placed on the resonator section. The frequency of vibration of the resonator section varies with variation in radially-directed stresses in the resonator section caused by pressure on the housing. Variation in the frequency of vibration of the resonator section thus affords a measure of the pressure to which the housing is subjected.

An improvement upon the device described above was recently developed to minimize the effect of temperature transients on the pressure measurements. See U.S. Pat. No. 4,550,610, for example. This improvement involves the placement of thinner sidewall sections at selected locations in the housing so that a non-uniform stress is produced in the resonator section. This non-uniform stress is then utilized to reduce scale factor dependence upon temperature.

Another piezoelectric device used to make temperature-corrected pressure measurements is disclosed in U.S. Pat. No. 4,562,375. This device also employs an outer housing in which is disposed a circular resonator section or pellet. The resonator pellet is held in place within the housing by two or more bridges which extend between the interior housing sidewall and locations on the periphery of the pellet, with the rest of the periphery being separated from the sidewall by a gap or "interval".

Providing fairly large devices of the designs described above, including relatively large diameter hollows or bores in the device housing, simplifies manufacturing and yields a resonator with desirable electrical performance characteristics. However, because of the size, each device is fairly expensive to manufacture because of the expense of finding or producing large pieces of suitable quartz. Also, the devices cannot be heated or cooled too rapidly if thermal fracturing is to be avoided; and stabilization of the devices to avoid errors in measurement of pressure after temperature or pressure changes is quite time consuming. Finally, it has been reported that with the devices of the above-described designs, large increases in resonator resistance and transducer pressure hysteresis occur as attempts are made to increase the operating temperature and pressure range of the transducers.

Transducers of smaller size have been fabricated and are considered desirable because, among other reasons, costs are less since smaller pieces of defect-free quartz are readily available. Also, higher operating temperatures and pressures can be measured without an increase in resonator resistance and transducer pressure hysteresis. But, because of the reduced size, and the small size of the bores, it has proved difficult to obtain precision in contouring the surfaces of the resonator section a desired feature of resonator pressure transducers.

SUMMARY OF THE INVENTION

It is an object of the invention to provide a relatively small resonator pressure transducer which is economical to manufacture and which exhibits desired pressure measuring capabilities.

It is also an object of the invention to provide such a transducer in which resonator resistance and transducer pressure hysteresis are reduced over extended pressure and temperature operating ranges.

It is a further object of the invention to provide a method of manufacturing resonator pressure transducers having centrally-positioned disc-shaped resonator sections in generally cylindrical hollow housings in which the upper and lower surfaces of the resonator sections are finely contoured with a generally spherically convex shape.

The above and other objects of the invention are realized in an illustrative resonator pressure transducer structure which includes a generally disc-shaped resonator section, a housing surrounding at least a substantial portion of the resonator section and joined to the perimeter thereof, with the housing having sidewalls which extend generally normal to the plane of the resontor section, and a pair of moats formed between the resonator section and the sidewalls of the housing about at least a substantial portion of the perimeter and on the top and bottom of the section. Apparatus is also included for causing the resonator section to vibrate.

Provision of the moats about the resonator section results in improved electrical performance and, in particular, reduced resonator resistance and resonator pressure hysteresis over extended pressure and temperature ranges. Inclusion of the moats also facilitates the proper shaping of the upper and lower surfaces of the resonator section to be generally spherically convex.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
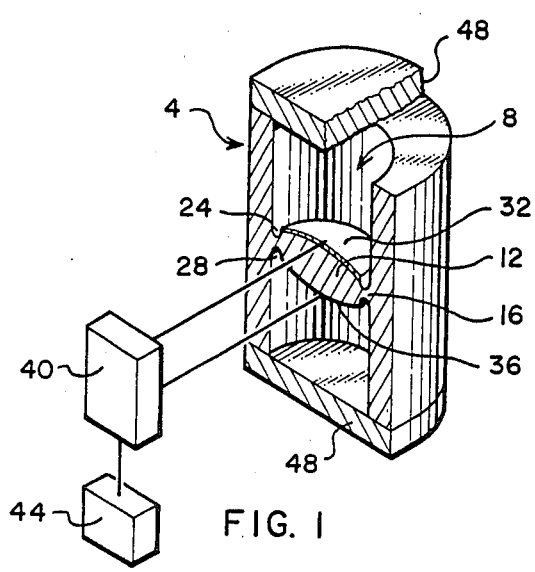
FIG. 1 shows a perspective, partially cut-away view of a resonator pressure transducer made in accordance with the principles of the present invention.
Figure 2:
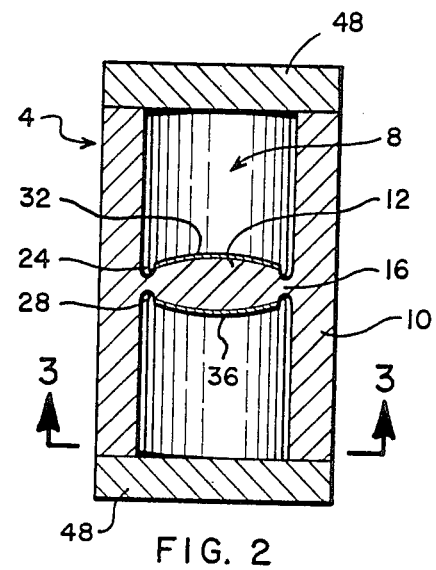
FIG. 2 is a side, cross-sectional view of the resonator pressure transducer of FIG. 1.
Figure 3:
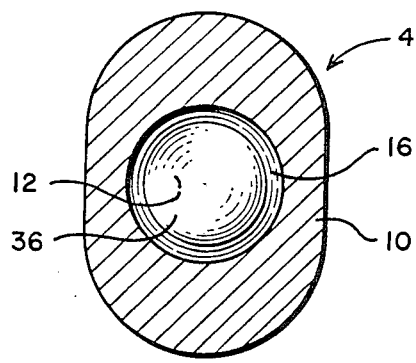
FIG. 3 is a top, cross-sectional view of the resonator pressure transducer of FIG. 1.

Referring to FIGS. 1 through 3, there is shown a resonator pressure transducer made in accordance with the present invention to include a generally cylindrical housing 4 having a cylindrical cavity 8. Disposed in the cavity 8 and integrally formed at its perimeter with sidewalls 10 of the housing is a disc-shaped resonator section 12. The sidewalls 10 of the housing 4 circumscribe the resonator section 12 and extend in opposite directions generally normal to the plane of the resonator section. (The housing 4 is shown integral with and surrounding the entire perimeter of the resonator section 12, but it should be understood that structure with the housing integral with and surrounding only a portion of the perimeter might also be used.) Advantageously, the housing 4 and resonator section 12 are integrally formed from quartz, and, preferably, AT-cut quartz, BT-cut quartz, SC-cut quartz or rotated X-cut quartz.

A web 16 joins the perimeter of the resonator section 12 to the sidewalls 10 of the housing 4. The web 16 is thinner than the resonator section 12 to define moats or grooves 24 and 28 on the top and bottom of the resonator section. Advantageously, the depths of the grooves 24 and 28 are about 0.005 to 0.010 inches, and the widths are about 0.010 to 0.020 inches. However, the precise depths and widths of the grooves are not as critical to improved operation (provided there are grooves), as they are to the manufacture and preparation of the transducers, as will be further described.

It is important that the groove's widths and depths not be so great or their shape so abrupt that vacuum deposition of metal thereover (for the electrodes 32 and 36 to be discussed momentarily) is impossible. With the sizes given above, the metal electrodes can be readily deposited.

End caps, such as end cap 48, are placed at both ends of the housing 4 to seal the interior of the housing and prevent the entry of fluid whose pressure is being measured. Of course, there are a variety of ways in which an enclosed housing could be constructed to suspend a resonator section 12 therein so that an exterior pressure on the sidewalls of the housing translates to the resonator section. The construction illustrated in FIGS. 1–3 is simply one illustrative embodiment for constructing such a housing.

Circuitry for causing the resonator section 12 to vibrate includes two electrodes 32 and 36 (FIG. 1) disposed respectively on opposite surfaces of the resonator section using techniques well known in the art. The electrodes 32 and 36 are coupled to an oscillator 40 which produces an oscillatory signal for application to the electrodes to cause the resonator section 12 to vibrate in a well-known manner. A display 44 is coupled to the oscillator to display the frequency of oscillation of the oscillator. As exterior pressure on the housing 4, and thus on the resonator section 12, varies, the frequency of vibration of the resonator section changes and the oscillator 40 follows the frequency change to oscillate at the same frequency as the resonator section. In this manner, changes in the frequency of vibration of the resonator section 12 can be detected and displayed to provide a measure of the pressure to which the housing 4 is subjected, for example, when immersed in a fluid.

Figure 4A:
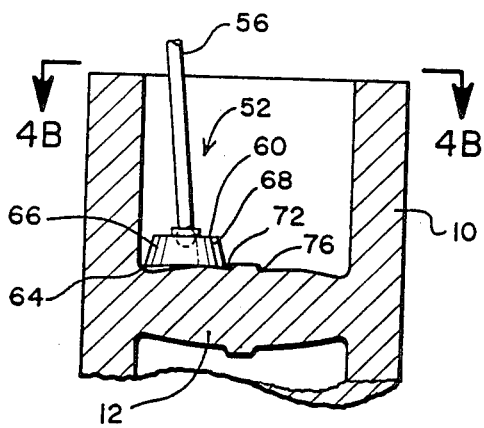
FIGS. 4A and 4B are a side, cross-sectional view and a top plan view respectively of a resonator pressure transducer showing problems in contouring the surfaces of the resonator section when moats or grooves are not provided about the section.
Figure 4B:
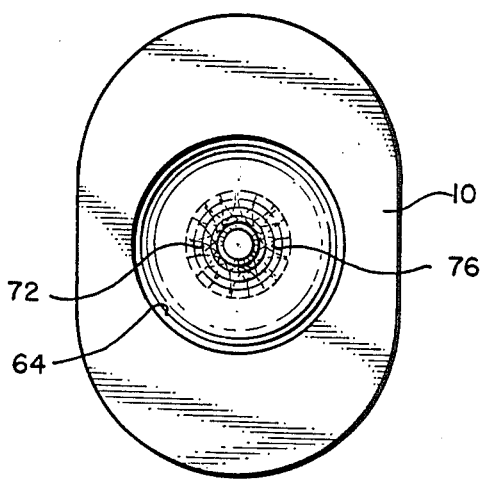

As shown especially in FIGS. 1 and 2, the upper and lower surfaces of the resonator section 12 are generally spherically convex. Operation and accuracy of the resonator pressure transducer is enhanced if the upper and lower surfaces of the resonator section 12 are precisely contoured in the spherically convex shape. One way of constructing the housing 4 with the resonator section 12 is to begin with a single piece of quartz crystal, properly shape the exterior thereof, and then remove quartz material to form the hollows or cavities 8 located above and below the resonator section 12. For small size resonator pressure transducers, which of course would have small diameter hollows 8, a spherically contoured lapping device 52 (FIG. 4A) could be used to properly shape the surfaces of the resonator section 12. The lapping device 52 includes a stylus 56 for controlling the shaping of the surfaces of the resonator section 12, and a lapping button 60 whose lower surface contains the contour and shape desired for the resonator section surfaces. Abrasive powder permits "lapping" the resonator section 12 to the same shape as the spherical shape of the lapping button 60. In the resonator pressure transducer structure of FIG. 4A, there are no moats or grooves surrounding the resonator section 12 and, in fact, the corners 64 are somewhat rounded. Because of this, when the lapping device 52 is used to shape the surfaces of the resonator section, it has been found that movement of the lapping button 60 into the corners 64 (formed by the sidewall 10 and resonator section 12) results in side 66 of the button riding upwardly on the sidewall 10 so that side 68 is pivoted or pushed downwardly to form a groove or irregularity 72 in the resonator section surface (the irregularity is exaggerated simply to illustrate the problem caused). Similarly, when the lapping button 60 is placed in the opposite corner to shape the resonator section surface, a groove or irregularity 76 is produced, again by pivoting action of the button when in the corner. The irregularities 72 and 76, shown in cross-section in FIG. 4, of course, create circular asymmetries, as shown in FIG. 4B, in the contour of the resonator section 12 and thus diminished performance of the resonator pressure transducer.

Similar irregularities would occur if the lapping button 60, rather than being smaller in diameter than the radius of the resonator section 12, were larger. Additionally, with a larger lapping button 60, a flat region may be formed at the center of the resonator section 12 due to the pivoting action of the button described above.

Figure 5:
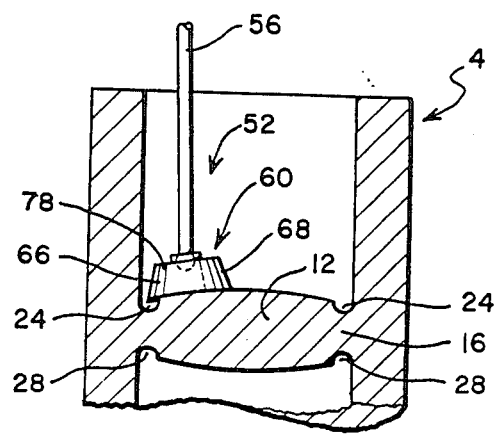
FIG. 5 is a side, cross-sectional view of a resonator pressure transducer illustrating the contouring of the surfaces of the resonator section when moats or grooves are positioned about the resonator section.

Forming a circular moat or a groove 24 (FIG. 5) surrounding the resonator section 12 prior to shaping and contouring the surfaces of the section eliminates the pivoting action of the lapping button 60 and so a smoother, more uniform spherically convex surface can be produced for the resonator section. The reason, of course, is that the side 66 of the lapping button 60 which is in the corner 64 does not ride up the sidewall 10 to cause the other side 68 of the lapping button to pivot or be pushed downwardly against the surface of the resonator section 12.

The width of the groove 24 should be sufficiently large to allow the edge 66 of the lapping button 60 to overhang the groove when the top corner 78 of the button is in contact with the interior surface of the sidewall 10. The groove 24 should also be deep enough so that the edge 66 does not touch the bottom of the groove before the top corner 78 touches the sidewall 10. Of course, tapering the sides of the lapping button 60 so that the top diameter of the button is smaller than the bottom diameter aids in getting the edge 66 into the corner formed between the sidewall 10 and resonator section 12 (to overhang the groove 24), but then, as the bottom working surface of the lapping button wears with use, the bottom surface diameter gets smaller requiring more frequent change of buttons.

In addition to facilitating the shaping of a more uniform surface for the resonator section 12, it has been found that the grooves 24 and 28 formed between the resonator section 12 and the sidewalls 10 serve to reduce resonance resistance and transducer hysteresis. It is known that resonator resistance and the Q factor (ability of a system to store energy) are improved with spherical contours of the resonating portion because the vibration energy of the resonator tends to localize in the thickest region—this is called "energy trapping". When the thickest region is symmetrically located in the center of the resonator disc, the shortest distance to the fixed edge (where energy can be lost) is as large as possible, and this is a desired circumstance. Additionally, providing a smooth contour in the center yields a larger active vibratory area and thus reduced resistance. With a distorted or irregular contour, the thinner portions of the resonator section have less vibration energy and this increases the resistance. By providing the grooves 24 and 28, less energy is allowed to "leak out" from the thick center region of the resonator section 12, and improved operation results.

With the addition of the grooves or moats surrounding the resonator section of a resonator pressure tranducer of the type described above, fabrication of the transducer is made easier and smaller size transducers with tolerable resistances can be fabricated and still provide an accurate and efficient device for measuring pressure.

It is to be understood that the above-described arrangements are only illustrative of the application of the principles of the present invention. Numerous modifications and alternative arrangements may be devised by those skilled in the art without departing from the spirit and scope of the invention, and the appended claims are to cover such modifications and arrangements.

What is claimed is:

1. A resonator pressure transducer comprising:
   a generally disc-shaped resonator section having generally convex, oppositely facing surface defined and circumscribed by a perimeter;
   a housing surrounding at least a substantial portion of the resonator section, said housing having side walls which extend generally normal to the plane of the resonator section;
   a web, abruptly thinner than the resonator section at its perimeter, joining the perimeter to the side walls and defining moats between the resonator section and the side walls of the housing about the perimeter and on the top and bottom of the section; and
   means for causing said resonator section to vibrate.

2. A resonator pressure transducer as in claim 1 wherein said web is formed integrally with the resonator section and side walls of the housing.

3. A resonator pressure transducer as in claim 2 wherein said resonator section is about 0.45 inches in diameter, and wherein the moats have a width of about 0.010 to 0.015 inches.

4. A resonator pressure transducer as in claim 2 wherein said web has a thickness of about 0.04 inches, and wherein said resonator section has a thickness of about 0.06 inches at its thickest part.

5. A transducer as in claim 2 wherein said resonator section is formed of crystalline quartz.

6. Pressure detection apparatus comprising:
   a generally disc-shaped quartz crystal resonator section adapted to vibrate in response to an oscillatory signal, with the frequency of vibration varying with variation in force applied at the perimeter of the resonator section;
   container structure having sidewalls which circumscribe at least a substantial portion of the resonator section and extend in opposite directions generally normal to the plane of the resonator section;
   a web, abruptly thinner than the resonator section, joining said sidewalls to that portion of the perimeter of the resonator section to which the sidewalls are adjacent to define grooves on the top and bottom sides of the resonator section and between the housing and said portion of the perimeter, said resonator section, housing and web being formed integral with one another;
   means for supplying an oscillatory signal to said resonator section to cause the section to vibrate.

7. Apparatus as in claim 6 wherein the web is formed with generally concave top and bottom surfaces.

8. A method of fabricating a resonator pressure transducer having a generally disc-shaped resonator section and a housing having sidewalls joined to the perimeter of the resonator section to circumscribe at least a portion of the section and extend in opposite directions generally normal to the plane of the section, said method including:
   providing a solid piece of quartz;
   removing quartz material from each end of the piece of quartz to leave a generally disc-shaped resonator section within generally cylindrical interior sidewalls formed in the piece of quartz;
   removing quartz material from the upper and lower surfaces of the resonator section adjacent the sidewalls to form two oppositely facing grooves which circumscribe the resonator section; and
   forming the upper and lower surfaces of the resonator section into generally spherically convex contours.

* * * * *